(12) United States Patent
Vangala et al.

(10) Patent No.: US 9,258,721 B2
(45) Date of Patent: Feb. 9, 2016

(54) SYSTEM AND METHOD TO SUPPORT DATA APPLICATIONS IN A MULTI-HOMING, MULTI-MODE COMMUNICATION DEVICE

(71) Applicant: Qualcomm Incorporated, San Diego, CA (US)

(72) Inventors: Venkata Satish Kumar Vangala, Milpitas, CA (US); Uppinder Singh Babbar, San Diego, CA (US); Phil Joseph Bostley, III, Boulder, CO (US); Vinay Paradkar, Broomfield, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/498,943

(22) Filed: Sep. 26, 2014

(65) Prior Publication Data

US 2015/0016442 A1    Jan. 15, 2015

Related U.S. Application Data

(62) Division of application No. 13/958,454, filed on Aug. 2, 2013, which is a division of application No. 11/349,314, filed on Feb. 6, 2006, now Pat. No. 8,526,463.

(60) Provisional application No. 60/686,844, filed on Jun. 1, 2005.

(51) Int. Cl.
*H04W 24/02* (2009.01)
*H04L 12/725* (2013.01)
(Continued)

(52) U.S. Cl.
CPC ............ *H04W 24/02* (2013.01); *G06F 3/0482* (2013.01); *H04L 41/22* (2013.01); *H04L 45/306* (2013.01); *H04L 45/308* (2013.01); *H04L 45/74* (2013.01); *H04L 47/32* (2013.01); *H04L 63/101* (2013.01); *H04W 40/02* (2013.01); *H04W 40/24* (2013.01); *H04W 48/18* (2013.01); *H04W 28/18* (2013.01); *H04W 80/04* (2013.01)

(58) Field of Classification Search
CPC ............ H04L 63/0227; H04L 63/0236; H04L 12/5695
See application file for complete search history.

(56) References Cited

U.S. PATENT DOCUMENTS 5,181,017 A    1/1993   Frey, Jr. et al.
6,078,587 A *  6/2000   Lynch et al. ................. 370/412
(Continued)

FOREIGN PATENT DOCUMENTS

EP    1465451 A2    10/2004
JP    5316248       11/1993
(Continued)

OTHER PUBLICATIONS

IEEE 802.11a, Part 11: Wireless LAN Medium Access Control (MAC) and Physical Layer (PHY) specifications, Amendment 1: High-speed Physical Layer in the 5GHz band, 2000.
(Continued)

*Primary Examiner* — Siming Liu
(74) *Attorney, Agent, or Firm* — Larry J. Moskowitz

(57) ABSTRACT

A method includes receiving a request to bind a port to a requesting application and determining whether an open application is bound to the port. The method further includes binding the requesting application to the port when the open application is not bound to the port.

20 Claims, 15 Drawing Sheets

(51) Int. Cl.
*H04L 29/06* (2006.01)
*H04W 40/02* (2009.01)
*H04W 48/18* (2009.01)
*H04L 12/741* (2013.01)
*H04L 12/823* (2013.01)
*G06F 3/0482* (2013.01)
*H04L 12/24* (2006.01)
*H04W 40/24* (2009.01)
*H04W 28/18* (2009.01)
*H04W 80/04* (2009.01)

(56) References Cited

U.S. PATENT DOCUMENTS

| | | | |
|---|---|---|---|
| 6,473,404 | B1 | 10/2002 | Kaplan et al. |
| 6,522,884 | B2 | 2/2003 | Tennison et al. |
| 7,065,367 | B2 | 6/2006 | Michaelis et al. |
| 7,120,697 | B2 | 10/2006 | Aiken, Jr. et al. |
| 7,146,130 | B2 | 12/2006 | Hsu et al. |
| 7,171,492 | B1 | 1/2007 | Borella et al. |
| 8,526,463 | B2 * | 9/2013 | Babbar et al. ............ 370/465 |
| 8,626,463 | B2 | 1/2014 | Stevens et al. |
| 2002/0116397 | A1 | 8/2002 | Berg |
| 2002/0178268 | A1 * | 11/2002 | Aiken et al. ............ 709/228 |
| 2003/0093558 | A1 | 5/2003 | Crump |
| 2003/0096611 | A1 | 5/2003 | Cooper |
| 2004/0009751 | A1 * | 1/2004 | Michaelis et al. ......... 455/62 |
| 2004/0100951 | A1 * | 5/2004 | O'neill .................. 370/389 |
| 2004/0220984 | A1 | 11/2004 | Dudfield et al. |
| 2005/0125511 | A1 | 6/2005 | Hunt |
| 2005/0238046 | A1 | 10/2005 | Hassan et al. |
| 2006/0084417 | A1 | 4/2006 | Melpignano et al. |
| 2013/0315146 | A1 | 11/2013 | Vangala et al. |
| 2015/0010006 | A1 | 1/2015 | Vangala |
| 2015/0012832 | A1 | 1/2015 | Vangala |

FOREIGN PATENT DOCUMENTS

| | | |
|---|---|---|
| JP | 2000244601 | 9/2000 |
| JP | 2001503578 T | 3/2001 |
| JP | 2002261857 | 9/2002 |
| WO | 9829975 A2 | 7/1998 |
| WO | 0133889 A1 | 5/2001 |
| WO | 2004077753 A2 | 9/2004 |

OTHER PUBLICATIONS

IEEE 802.11b-1999/Cor 1-2001, Part 11: Wireless LAN Medium Access Control (MAC) and Physical Layer (PHY) specifications, Amendment 2: Higher-speed Physical Layer (PHY) extension in the 2.4 GHz band—Corrigendum 1.

IEEE 802.11i/D2.0, Mar. 2002, Part 11: Wireless Medium Access Control (MAC) and Physical Layer (PHY) specifications: Specification for Enhanced Security.

IEEE 802.15.1-2005, Part 15.1: Wireless medium access control (MAC) and physical layer (PHY) specifications for wireless personal area networks (WPANs).

IEEE 802.16 IEEE Standard for Local and metropolitan area networks, Part 16: Air Interface for Fixed Broadband Wireless Access Systems, IEEE Std. 802.16-2004 (Revision of IEEE Std. 802.16-2001), Oct. 1, 2004.

IEEE Std. 802.11g IEEE Standard for Information technology—Telecommunications and information exchange between systems—Local and metropolitan area networks-Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

International Preliminary Report on Patentability—PCT/US06/021384, The International Bureau of WIPO, Geneva, Switzerland, Dec. 21, 2007.

International Search Report and Written Opinion—PCT/US06/021384, International Search Authority—European Patent Office, Feb. 6, 2007.

Taiwanese Search report—095119479, TIPO—Dec. 28, 2009.

* cited by examiner

SYSTEM AND METHOD TO SUPPORT DATA APPLICATIONS IN A MULTI-HOMING, MULTI-MODE COMMUNICATION DEVICE

REFERENCE TO RELATED APPLICATIONS

The present application is a divisional application of, and claims priority from, U.S. patent application Ser. No. 13/958,454 filed on Aug. 2, 2013 and entitled "SYSTEM AND METHOD TO SUPPORT DATA APPLICATIONS IN A MULTI-HOMING, MULTI-MODE COMMUNICATION DEVICE", which is a divisional application of, and claims priority from, U.S. patent application Ser. No. 11/349,314 filed on Feb. 6, 2006, now U.S. Pat. No. 8,526,463, and entitled "SYSTEM AND METHOD TO SUPPORT DATA APPLICATIONS IN A MULTI-HOMING, MULTI-MODE COMMUNICATION DEVICE", which claims priority from U.S. Provision Patent Application 60/686,844 filed Jun. 1, 2005 and entitled "METHOD TO SUPPORT DATA APPLICATIONS IN A MULTIHOMED MULTIMODE COMMUNICATION DEVICE", the contents of each of which are expressly incorporated herein by reference in their entirety.

BACKGROUND

I. Field

The present disclosure generally relates to network devices. More particularly, the disclosure relates to multi-homing network devices.

II. Description of Related Art

In recent years, the number of wireless handsets in operation has increased dramatically. With the increase in demand for these mobile devices, the manufacturers are building these devices to include numerous data services. This convergence of data services can make wireless devices powerful resources for data networking. However, due to the increase in data services provided by wireless devices, the number of nefarious attacks on wireless devices has also increased. Hence, there is an increasing concern to protect these devices from malicious attacks.

Wireless telephones have become multi-homing devices that include many data interfaces through which the wireless telephones can accept and send data. At any time, within a particular wireless telephone, more than one of these data interfaces can be open for direct data transfer with the Internet, or another data network. The data protocol stack in the mobile device is mostly transparent to the multiple data interfaces of the device. Further, the data protocol stack can accept data from any of the data interfaces as long as the protocol address of the incoming data matches the protocol address of the phone. As such, the wireless telephone is open and vulnerable to many attacks from the Internet and other data networks.

For example, when a packet is received on a data interface at a multi-homing device, the packet can be routed to an appropriate socket, or application. In general, for a socket that is connected using transmission control protocol (TCP), a packet is routed to the socket based on four (4) tuples, e.g., source address (src_addr), source port (src_port), destination address (dst_addr), and destination port (dst_port). For a socket that is connected using user datagram protocol (UDP), a packet is routed to the socket based on two tuples, e.g., destination address (dst_addr) and destination port (dst_port). For other protocols, such as Internet control message protocol (ICMP) or non-Internet Protocol (IP) based protocols, other fields in the network and transport layer headers can be used.

Unfortunately, in a multi-homing device the parameters described above may not be able to uniquely identify a data interface for several reasons. For example, the data interfaces within a multi-homing device may be assigned duplicate private addresses. Also, multiple applications within the multi-homing device may try to access the same service using different network data interfaces. In such scenarios, the applications may bind to the same service access point (SAP), e.g., the same port number in case of UDP or TCP. As such, it may not be possible to correctly route a packet to the appropriate destination application.

A multi-homing device may also be vulnerable to spurious attacks via the different data interfaces available at the multi-homing device. For example, in a typical multi-homing device, an application installed therein can receive data from any network data interface as long as the data interface is open for data transfer and the data protocol addresses, e.g., IP address, port number, etc., match with that of the application.

Apart from security considerations, data network providers are also concerned about the billing and usage of various services and technologies available to the mobile telephones on the data networks. For example, there is a certain cost associated with each new service and technology that a data network provider provides and carriers are typically interested in hassle free discrete billing of various services used by the mobile phone user. If an application within a mobile telephone is restricted to use certain data interfaces available at the mobile telephone for data transfers, it can be easier for the carrier network to track the billing and cost associated with the usage of the different technologies and services distinctly, based on per-data interface usage.

Additionally, in a multi-homing networking device, the port space for networking applications is usually shared between all of the data interfaces available to the device. If an application is using a particular port number for data transfer on a particular data interface, no other application can use the same port number—even if the other application is using a completely different data interface. This can be an unnecessary restriction for a device that may need to run different services on different data interfaces but with the same port number. For example, the network device can include two different web servers that use the same port number, e.g., port eighty (80), but on different data interfaces. Most network devices do not allow this flexibility. Some implementations allow binding to a port for all of the data interfaces or for a specific data interface, i.e., one interface or all interfaces.

SUMMARY

A method of transmitting data from a multi-homing network device to a data network is disclosed and includes defining a network policy and transmitting the network policy to a routing module. Further, the method includes receiving a route scope from the routing module. The route scope identifies a subset of data interfaces to the data network that satisfy the network policy wherein the subset of data interfaces are selected from a set of available data interfaces and wherein the subset of data interfaces includes at least one data interfaces.

In a particular embodiment, the network policy identifies one or more criteria for selecting the subset of data interfaces from the set of available data interfaces. Further, the network policy defines two or more data interfaces to be used for data transfer to and from an application. In another particular embodiment, the network policy is defined by an application.

In yet another particular embodiment, the subset of data interfaces includes a global system for mobile communications (GSM) data interface, a general packet radio service (GPRS) data interface, a universal mobile telecommunications system (UMTS) data interface, a code division multiple access (CDMA) data interface, a CDMA 2000 data interface, a CDMA evolution data optimized (EVDO) interface, a Bluetooth (BT) data interface, an 802.11a data interface, an 802.11b data interface, an 802.11g data interface, an 802.11i data interface, an 802.15 data interface, an 802.16 data interface, a wideband CDMA (WCDMA) data interface, an orthogonal frequency code division multiplexing (OFCDM) data interface, a global positioning system (GPS) data interface, or a combination thereof. In a particular embodiment, each of the interfaces can be an Internet Protocol version 4 (IPv4) data interface, an IP version 6 (IPv6) data interface, or another network protocol data interface.

In still another particular embodiment, an application associated with the network policy is bound to the subset of data interfaces identified by the route scope. In another embodiment, the method includes determining whether a preferred data interface within the subset of data interfaces is available, opening a connection via the preferred data interface when the preferred data interface is available, and transmitting data via the preferred data interface. Further, the method includes determining whether a next preferred data interface within the subset of data interfaces is available when the preferred data interface is unavailable, opening a connection via the next preferred data interface, and transmitting data via the next preferred data interface. In still another embodiment, the method includes determining whether the connection is interrupted, determining whether a next preferred data interface is available when the connection is interrupted, opening a connection via the next preferred data interface, and transmitting data via the next preferred data interface.

In another embodiment, a multi-homing network device is disclosed and includes a processor and a memory that is accessible to the processor. Further, at least one application is stored within the memory and at least one network policy is stored within the memory. In this embodiment, the at least one network policy defines at least one data interface to be used by the application to transmit and receive data.

In yet another embodiment, a computer readable medium that is accessible to a processor is disclosed and includes at least one application and at least one network policy that is associated with the at least one application. In this embodiment, the network policy identifies two or more data interfaces of a multi-homing network device that can be used to communicate data with respect to the application.

In still another embodiment, a method of binding data interfaces to an application is disclosed and includes receiving a network policy from the application and binding the application to a subset of data interfaces but not all data interfaces within a set of available data interfaces at a multi-homing network device. In this embodiment, the subset of data interfaces includes at least one data interface.

In yet still another embodiment, a method of receiving data is disclosed and includes receiving a data packet from a data interface, comparing an Internet Protocol (IP) address of the data interface to a destination IP address associated with the packet, and dropping the data packet when the IP address of the data interface does not match the destination IP address.

In another embodiment, a multi-homing network device is disclosed and includes a processor, a memory that is accessible to the processor, and a routing module that is stored within the memory. In this embodiment, the routing module is configured to receive a network policy from an application and bind the application to a subset of data interfaces within a set of available data interfaces.

In still another embodiment, a computer readable medium that is accessible to a processor is disclosed and includes a route scope. In this embodiment, the route scope indicates a subset of data interfaces within a set of available data interfaces at a multi-homing device and an application within the multi-homing device is bound to the subset of data interfaces for transmitting and receiving data.

In yet another embodiment, a method of binding an application to at least one port within a network device is disclosed and includes receiving a request to bind a port to a requesting application, determining whether an open application is bound to the port, and binding the requesting application to the port when the open application is not bound to the port.

In still another embodiment, a user interface is disclosed and includes an application menu. In this embodiment, the application menu includes a list of applications that are installed at a multi-home network device and a user can select an application from the application menu in order to edit at least one network setting associated with a selected application.

In still yet another embodiment, a multi-homing network device is disclosed and includes means for transmitting a network policy to a routing module and means for storing a route scope from the routing module in a socket. In this embodiment, the route scope identifies a subset of data interfaces to a data network that satisfy the network policy and the subset of data interfaces are selected from a set of available data interfaces. Further, the subset of data interfaces includes at least one data interface.

In another embodiment, a multi-homing network device is disclosed and includes means for receiving a network policy from an application and means for binding the application to a subset of data interfaces but not all data interfaces within a set of available data interfaces at the multi-homing network device. In this embodiment, the subset of data interfaces includes at least one data interface.

In still another embodiment, a multi-homing network device is disclosed and includes means for receiving a data packet from a data interface, means for comparing an Internet Protocol (IP) address of the data interface to a destination IP address associated with the packet, and means for dropping the data packet when the IP address of the data interface does not match the destination IP address.

In another embodiment, a multi-homing network device is disclosed and includes means for receiving a request to bind a port to a requesting application, means for determining whether an open application is bound to the port, and means for binding the requesting application to the port when the open application is not bound to the port.

An advantage of one or more embodiments disclosed herein can include binding an application to a subset of available network data interfaces.

Another advantage can include dropping incoming data packets that do not arrive on data interfaces approved by an application.

Yet another advantage can include transmitting data packets based on a hierarchy of available data interfaces for an application.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
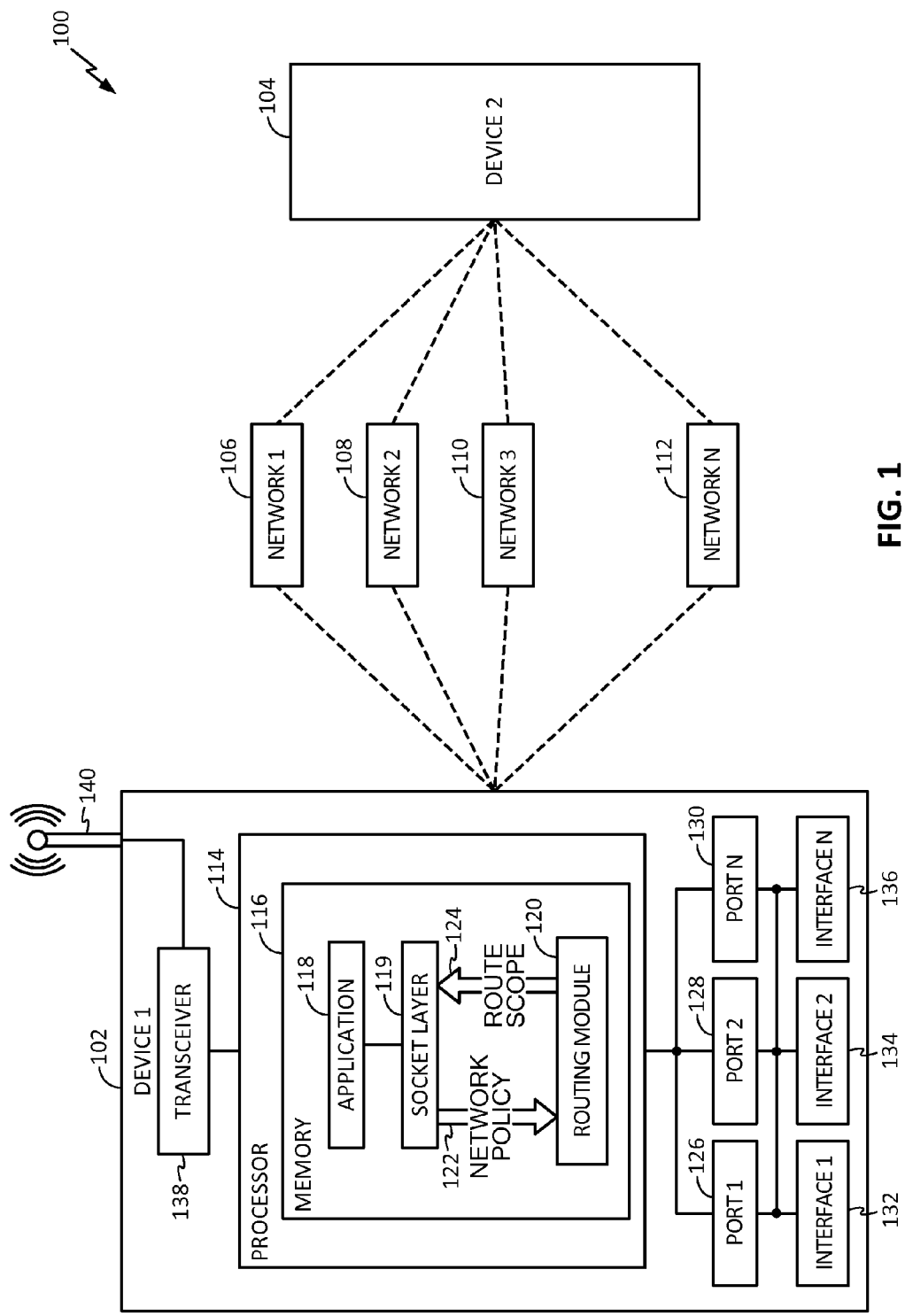
FIG. 1 is a general diagram that illustrates a particular embodiment of a communication system.

Referring to FIG. 1, an exemplary, non-limiting communication system is shown and is generally designated 100. As shown, the system includes a first network device 102 and a second network device 104. In a particular embodiment, the first network device 102 and the second network device 104 can communicate via one or more of a first data network 106, a second data network 108, a third data network 110, and an Nth data network. In a particular embodiment, the data networks 106, 108, 110, 112 can be a global system for mobile communications (GSM) network, a general packet radio service (GPRS) network, a universal mobile telecommunications system (UMTS) network, a code division multiple access (CDMA) network, a CDMA 2000 network, a CDMA evolution data optimized (EVDO) network, a Bluetooth BT network, an 802.11a network, an 802.11b network, an 802.11g network, an 802.11i network, an 802.15 network, an 802.16 network, a wideband CDMA (WCDMA) network, an orthogonal frequency code division multiplexing (OFCDM) network, a global positioning system (GPS) network, or a combination thereof.

As shown in FIG. 1, the first network device 102 can include a processor 114 and a memory 116 that is accessible to the processor 114. As shown, an application 118, a socket layer 119, and a routing module 120 can be embedded, or stored, within the memory 116 and can be executable by the processor 114. In a particular embodiment, the socket layer 119 includes one or more sockets that can be used by an application to send and receive data. During operation, the application 118 transmits a network policy 122 to the routing module 120 via the socket layer 119. In a particular embodiment, the network policy 122 can identify a set of data interfaces that can be used by an application to communicate with one or more of the networks 106, 108, 110, 112. In response to the network policy 122, the routing module 120 returns a route scope 124 to the socket layer 119 and the route scope can be stored within the socket layer 119 for a socket associated with the application 118. In a particular embodiment, the route scope 124 includes a subset of data interfaces that satisfy the network policy. The subset of data interfaces are selected from the available data interfaces 132, 134, 136 at the first network device 102.

FIG. 1 indicates that the first network device 102 can include a first hardware port 126, a second hardware port 128, and an Nth hardware port 130. Also, the network device 102 can include a first data interface 132, a second data interface 134, and an Nth data interface 136.

In a particular embodiment, each of the data interfaces 132, 134, 136 can be a global system for mobile communications (GSM) data interface, a general packet radio service (GPRS) data interface, a universal mobile telecommunications system (UMTS) data interface, a code division multiple access (CDMA) data interface, a CDMA 2000 data interface, a CDMA evolution data optimized (EVDO) interface, a Bluetooth BT data interface, an 802.11a data interface, an 802.11b data interface, an 802.11g data interface, an 802.11i data interface, an 802.15 data interface, an 802.16 data interface, a wideband CDMA (WCDMA) data interface, an orthogonal frequency code division multiplexing (OFCDM) data interface, a global positioning system (GPS) data interface, or a combination thereof. In a particular embodiment each of the interfaces can be an Internet Protocol version 4 (IPv4) data interface, an IP version 6 (IPv6) data interface, or another network protocol data interface.

As illustrated in FIG. 1, the first network device 102 also includes a transceiver 138 that is coupled to the processor 114 and an antenna 140. In a particular embodiment, the transceiver 138 transmits and receives data packets and facilitates communication with one or more of the networks 106, 108, 110, 112. In a particular embodiment, the second network device 104 can include one or more of the elements described in conjunction with the first network device 102.

In a particular embodiment, the first network device 102, or the second network device 104, is a multi-homing networking asset. Further, in order to support the vast diversity of the data services, the first network device 102 includes multiple network data interfaces 132, 134, 136. Each of the data interfaces 132, 134, 136 are capable of data transfer once each data interface is configured to connect to an associated network 106, 108, 110, 112. In a particular embodiment, with multi-homing, one or more of the data interfaces 132, 134, 136 may be active simultaneously and each active data interface 132, 134, 136 can provide access to a different physical or logical network 106, 108, 110, 112.

Moreover, in a particular embodiment, each active data interface 132, 134, 136 includes a separate network address, e.g., IP address for IP networks, assigned thereto. Each of the network addresses can be globally unique or one or more of the network addresses may be duplicated if assigned from a private space.

In a particular embodiment, multi-homing can allow the first network device 102 to access different networks having different data technologies, e.g., CDMA, UMTS, GSM, etc. Further, multi-homing can allow the first network device 102 to access the available networks 106, 108, 110, 112 based on the varying costs associated with the available networks 106, 108, 110, 112. As such, the user, or applications within the first network device 102, is given more flexibility on the quality and cost effectiveness desired. Multi-homing can also allow the first network device to access the available networks 106, 108, 110, 112 based on the quality of services that the networks provide. A user may desire that a particular application use a high quality network—regardless of the cost associated with using the network. On the other hand, the user may instruct an application to not exceed a particular cost and only use networks below the cost—regardless of the quality of the network connection.

In a particular embodiment, multi-homing can allow the first network device 102 to access different network types, e.g., IPv4, IPv6, IPX, etc. Also, multi-homing can allow applications within the first network device 102 to access various services provided by different physical/logical networks. For example, a particular carrier may deploy different networks to provide different type of IP services, e.g., Internet, email, SMS, MMS, WAP, etc.

Figure 2:
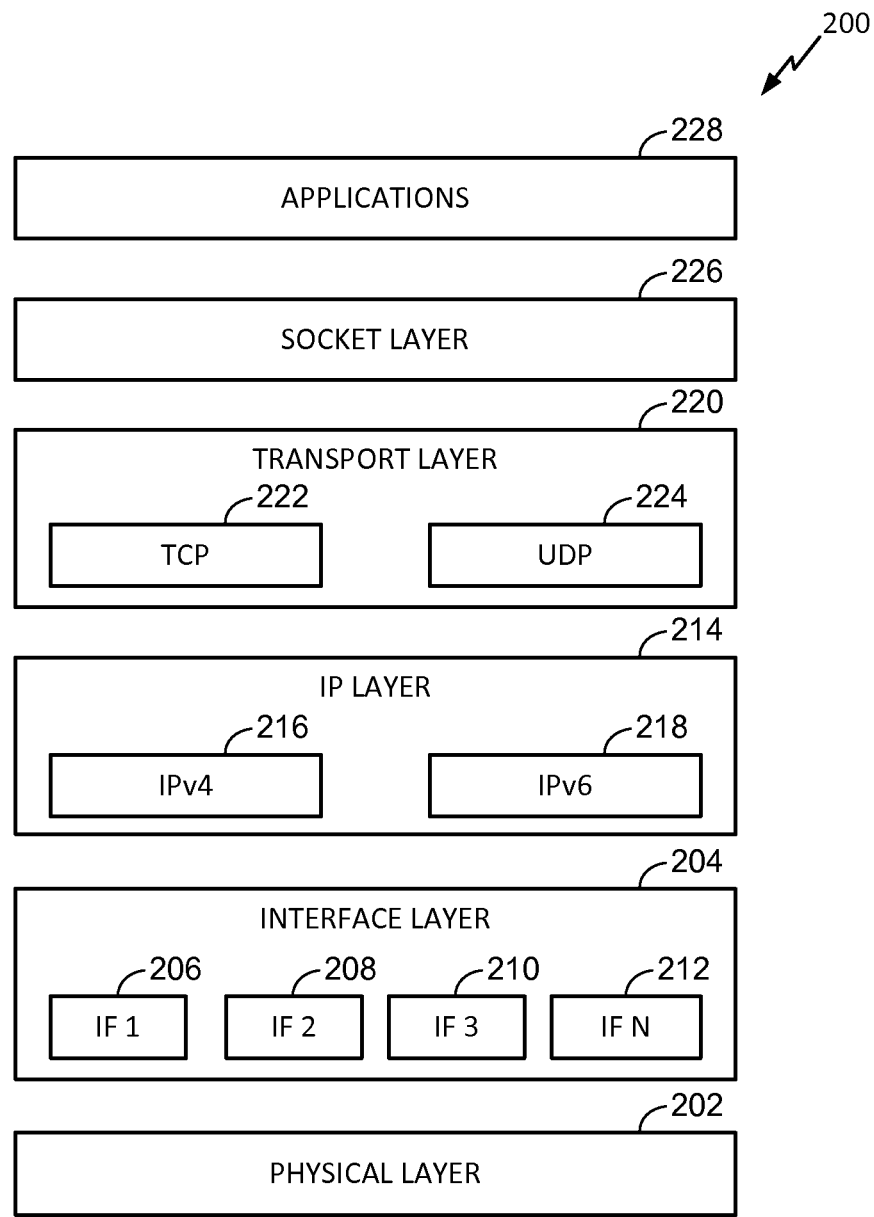
FIG. 2 is a general diagram that illustrates a data networking stack.

FIG. 2 illustrates an exemplary, non-limiting embodiment of a TCP/IP networking stack, generally designated 200. As shown, the networking stack 200 includes a physical layer 202. A data interface layer 204 is located over the physical layer 202. In a particular embodiment, the data interface layer 204 includes a first data interface 206, a second data interface 208, a third data interface 210, and an Nth data interface 212.

As depicted in FIG. 2, an Internet Protocol (IP) layer 214 is located over the data interface layer 204. In an illustrative embodiment, the IP layer 214 includes one or more IPs, e.g., IP version 4 (IPv4) 216 and IP version 6 (IPv6) 218. FIG. 2 further shows a transport layer 220 over the IP layer 214. The transport layer 220 can include one or more communication protocols, e.g., transmission control protocol (TCP) 222 or user datagram protocol (UDP) 224. Further, a socket layer 226 can be located over the transport layer 220. Also, one or more applications can be located over the socket layer 226.

Figure 3:
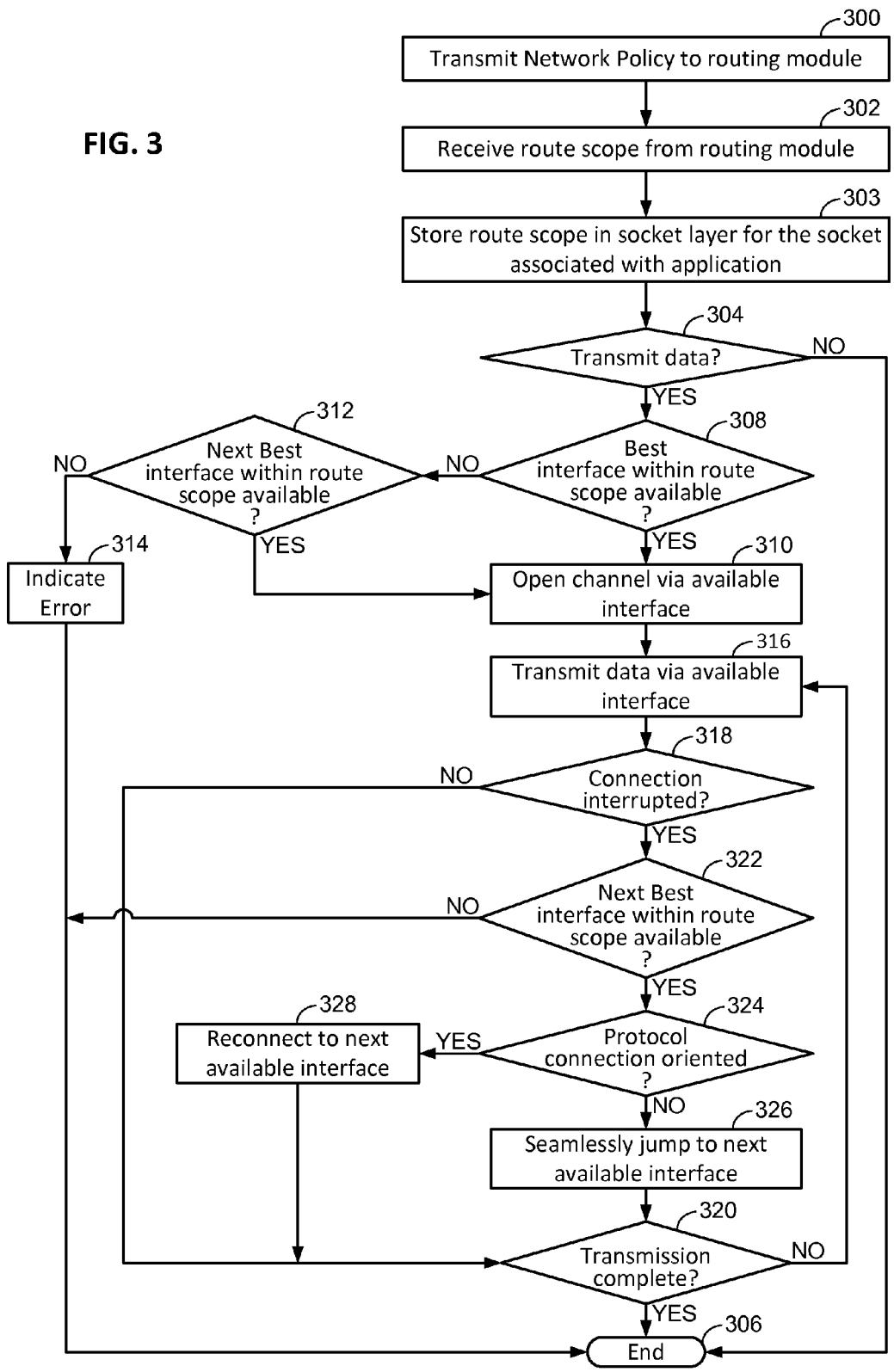
FIG. 3 is a flow chart illustrating a method of transmitting data.

Referring to FIG. 3, a method of transmitting data from a network device to a data network is shown and commences at block 300. At block 300, an application within the network device transmits a network policy to a routing module within the network device. In a particular embodiment, the application and the routing module are concurrently executable by a single processor. Alternatively, the application and routing module can be executed by different processors.

In a particular embodiment, the network policy can identify a set of data interfaces that satisfy one or more criteria specified in the network policy. For example, a network policy can specify the criteria as all UMTS data interfaces, or all IPv4 data interfaces. Further, the network policy can specify a quality of service criteria, e.g., a maximum delay value, a maximum jitter value, a bandwidth value, or a combination thereof. Also, the network policy can specify a maximum cost, communication technology type, one or more carriers, or a combination thereof. Before data transfer can be initiated by an application, the application can bring up a particular data interface among a set of data interfaces that satisfy the network policy.

In another particular embodiment, the decision of which data interface to bring up, can be performed by the network management software of the data stack. Further, the decision can be performed on the basis of a most favored route, e.g., based on the specified network policy. In a particular embodiment, each data interface can include its own access control list (ACL), which is essentially a list of rules. Moreover, each data interface can evaluate access to thereto based on a network policy associated with an application. As part of the evaluation, an ACL can either restrict the access to a data interface or return a non-zero priority number, e.g., 1-5, for that data interface. A non-zero priority number signifies that the data interface is usable with the given policy and the priority number identifies the level of preference.

In an illustrative embodiment, a routing module can evaluate a network policy associated with an application and an ACL associated with each of the available data interfaces and select the data interface with the highest priority. As such, the routing module can bind the application to the data interface with the highest priority in order to send the data out. In a particular embodiment, at any give time, many data interfaces may be open for data transfer and each data interface can be bound to separate applications in order to allow transmit side multi-homing on the wireless device. If a particular data interface is not open, it can be brought up to make it open for data communication.

Moving to block 302, a route scope is received from the routing module. Further, at block 303, the route scope can be stored within a socket layer for a socket associated with the application. In a particular embodiment, the route scope indicates a subset of data interfaces that satisfy the network policy. Each data interface in the subset can include a priority number. As such, the subset of data interfaces can be arranged in a hierarchy from a preferred data interface to a least preferred data interface. In an illustrative embodiment, the subset of data interfaces is selected from a set of available data interfaces at the network device.

At decision step 304, the network device determines whether the application is attempting to transmit data to a data network. If not, the method ends at state 306. If so, the method proceeds to decision step 308 and the network device determines whether the preferred data interface within the route scope, i.e., within the subset of data interfaces bound to the application, is available. If the preferred data interface is available, the method moves to block 310 and the network device opens a channel via the preferred data interface. Conversely, if the preferred data interface is not available, the method proceeds to decision step 312 and the network device determines whether a next preferred data interface within the route scope is available.

If a next preferred data interface is not available, the method moves to block 314 and an error message is displayed to the user of the network device, e.g., via a display at the network device. Otherwise, if a next preferred data interface is available, the method proceeds to block 310 and the network device opens a channel via the data interface. In a particular embodiment, there may be multiple iterations before the error message is displayed. In other words, there may be multiple next preferred data interfaces in the hierarchy of data interfaces. For example, the hierarchy of data interfaces can include a preferred data interface, a first next preferred data interface, a second next preferred data interface, a third next preferred data interface, etc. In a particular embodiment, the network device can keep checking for a next available interface until all interfaces within the route scope are exhausted.

Proceeding to block 316, the application transmits data via the available data interface. At decision step 318, the network device determines whether the connection is interrupted. If not, the method moves to decision step 320 and the network device determines whether the transmission of data is complete. If so, the method ends at state 306. If the transmission of data is not complete, the method returns to block 316 and continues as described.

Returning to decision step 318, if the connection is interrupted, the method moves to decision step 322 and the network device determines whether the next preferred data interface within the route scope is available. If not, the method ends at state 306. On the other hand, if the next preferred data interface is available, the method continues to decision step 324 and the network device determines whether the protocol for the data transfer is connection oriented. If the protocol is not connection oriented, e.g., the protocol is connectionless user datagram protocol (UDP), the method moves to block 326 and the application seamlessly jumps to the next available data interface without interrupting the connectivity. Conversely, if the protocol is connection oriented, e.g., the protocol is transmission control protocol (TCP), the method proceeds to block 328 and the application reconnects to the next available data interface. If the protocol is TCP, the connectivity will be interrupted while the application reconnects via the new data interface. From block 326 or block 328, the method proceeds to decision step 320 and continues as described.

In a particular embodiment, using the above described method, an application can specify a network policy for data transfer associated with the application. The network policy can restrict the data interfaces on which the application sends and receives data. On the transmit path, one data interface is chosen for the application from a subset of approved data interfaces. In a particular embodiment, the data interface that is chosen can be the most favorable, i.e., highest priority, based on the network policy criteria, thereby optimizing the transmit path. Further, in a particular embodiment, the application uses the selected transmit data interface until the data transfer is completed or the data interface is lost. If the data interface is lost, a new data interface is chosen from the subset of data interfaces, if available, based on priority. This allows the data transmission to conform to the network policy even if the highest priority data interface is lost.

Figure 4:
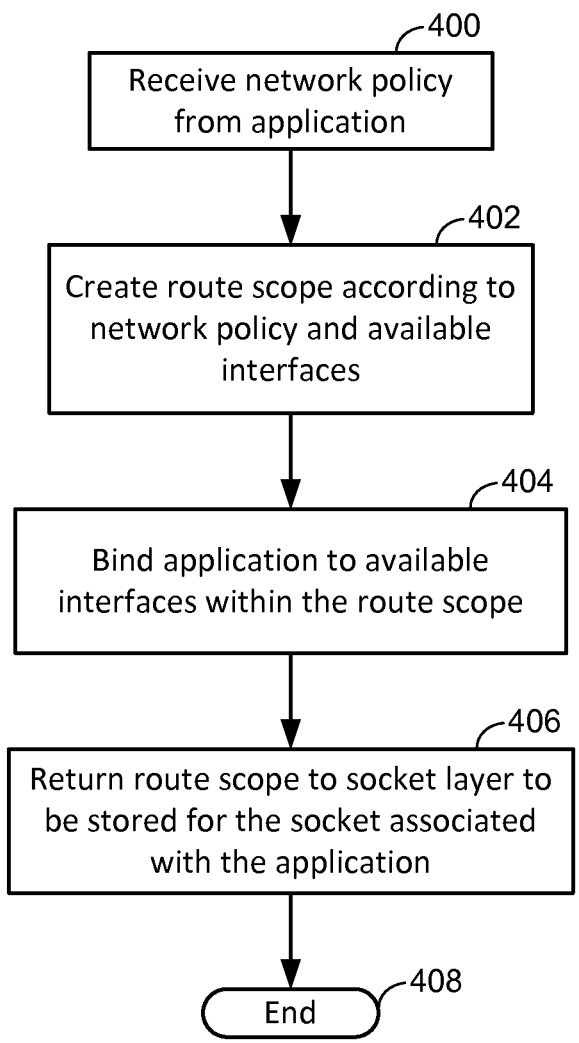
FIG. 4 is a flow chart illustrating a method of binding an application to a subset of available data interfaces.

FIG. 4 depicts a method of binding an application to a subset of data interfaces within a group of available data interfaces. Beginning at block 400, a routing module receives a network policy from an application. At block 402, the routing module creates a route scope according to network policy and available data interfaces. In a particular embodiment, the route scope includes, or points to, a subset of available data interfaces that satisfy the network policy of the application. Moving to block 404, the routing module binds the application to the available data interfaces within the route scope. At block 406, the routing module, returns the route scope to the socket layer to be stored for the socket associated with the application. The method then ends at state 408.

Figure 5:
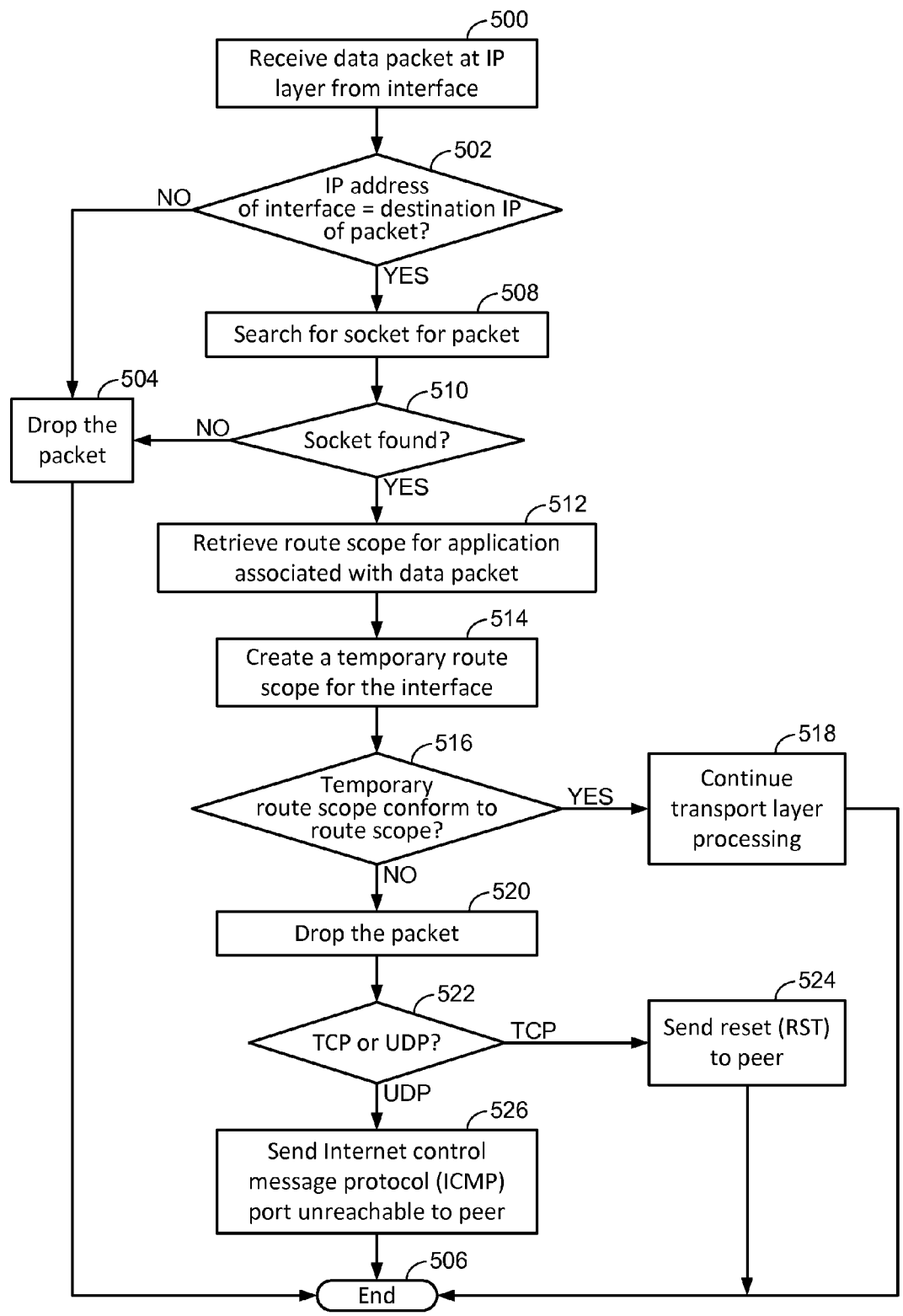
FIG. 5 is a flow chart illustrating a method of receiving data.

Referring to FIG. 5, a method of receiving data at a network device from a data network is shown and commences at block 500. At block 500, the network device receives a data packet at the IP layer of the data stack from a data interface. Moving to decision step 502, the network device determines whether the destination IP address of the data packet is the same as the IP address of a data interface assigned to the application. If not, the method proceeds to block 504 and the data packet is dropped. The method then ends at state 506.

If the destination IP address of the data packet is the same as the IP address of the data interface, the method moves to block 508 and the network device searches for a socket associated with the data packet. At decision step 510, the network device determines whether the socket is found. If not, the method moves to block 504 and the data packet is dropped. The method then ends at state 506.

At decision step 510, if the socket is found, the method proceeds to block 512 and a route scope associated with the application is retrieved. At block 514, a temporary route scope for the data interface is created. In a particular embodiment, the temporary route scope is created by determining the index of the input data interface and turning the corresponding bit to 1 and keeping every other bit in the temporary route scope as 0.

Figure 6:
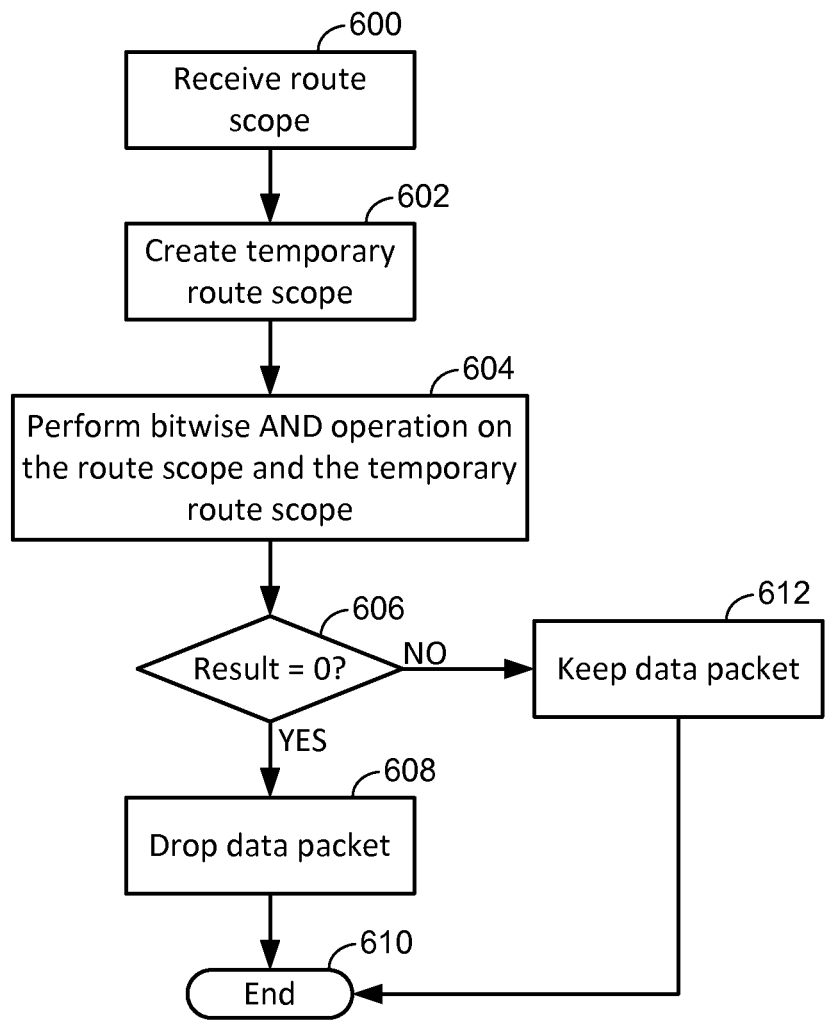
FIG. 6 is a flow chart illustrating a method of determining whether a temporary route scope conforms to a route scope of an application.

Moving to decision step, it is determined whether the temporary route scope conforms to the route scope associated with the application. FIG. 6 illustrates a detailed embodiment of determining whether the temporary route scope conforms to the route scope associated with the application. If the temporary route scope conforms to the route scope of the application, the method moves to block 518 and the network device continues the transport layer processing of the data packet. The method then ends at state 506.

If the temporary route scope does not conform to the route scope of the application, the method moves to block 520 and the network device drops the data packet. Proceeding to decision step 522, the network device determines whether the current communication protocol is TCP or UDP. If the current communication protocol is TCP, the method moves to block 524 and the network device sends a reset (RST) message to the peer device that transmitted the data packet that is dropped. The method ends at state 506. If the current communication protocol is UDP, the network device sends an Internet control message protocol (ICMP) destination unreachable port unreachable to the peer device that transmitted the data packet that is dropped at the network device. The method then ends at state 506.

In a particular embodiment, using the method described above, when a packet arrives via a data interface for some connection it can be restricted to the data interfaces allowed in the route scope in two stages. For example, the first stage is a simple sanity check. This stage involves the comparison of the IP address of the data interface the packet came on and the destination address of the packet. The only exception to this being that the destination address should not be a multicast or a broadcast address. When the input packet is handed over to the IP layer, the IP layer is notified of the data interface that the packet came in. If the destination IP address of the packet does not match to that of the data interface it came, on then the packet is dropped silently. This restricts the packets to particular data interfaces with specific IP addresses and prevents any routing errors happening for the input packet.

FIG. 6 illustrates a method of determining whether a temporary route scope conforms to a route scope of an application. Beginning at block 600, a route scope for an application is received. At block 602, a temporary route scope is created. Thereafter, at block 604, a bitwise AND operation is performed on the route scope and the temporary route scope. Moving to block 606, it is determined whether the result of the AND operation is zero. If the result is zero, the method moves to block 608 and the packet is dropped. The method then ends at state 610. On the other hand, if the result is not zero, the method moves to block 612 and the data packet is kept. Then, the method ends at state 610.

In a particular embodiment, the route scope contains information about which data interfaces are allowed to receive data on for a particular application. The route scope can be maintained as a bit mask of all available data interfaces. When a data interface satisfies the network policy for a particular application, the data interface is added to the route scope associated with the particular application. For example, if a fifth data interface, having an index five (5), satisfies the network policy for the application, a bit number five (5) in the route scope for the application is set to one (1) in order to include the fifth data interface in the route scope for the application.

In a particular embodiment, when limiting the data received, all the data interfaces that have priority greater than zero are included in the route scope for the application. The method reviews the ACL for each data interface and includes all the data interfaces in the route scope for the application that satisfy the network policy for the application. In a particular embodiment, the route scope can include one or more bits that are set to one (1) indicating that the application associated with the route scope is allowed to receive data via one or more of data interfaces.

In a particular embodiment, if an application binds to a specific IP address, the route scope can be restricted to include the data interfaces with the requested IP address and that also match the network policy. In another particular embodiment, the route scope is created when an application creates a socket with a specific network policy. However, the route scope may be periodically updated.

Figure 7:
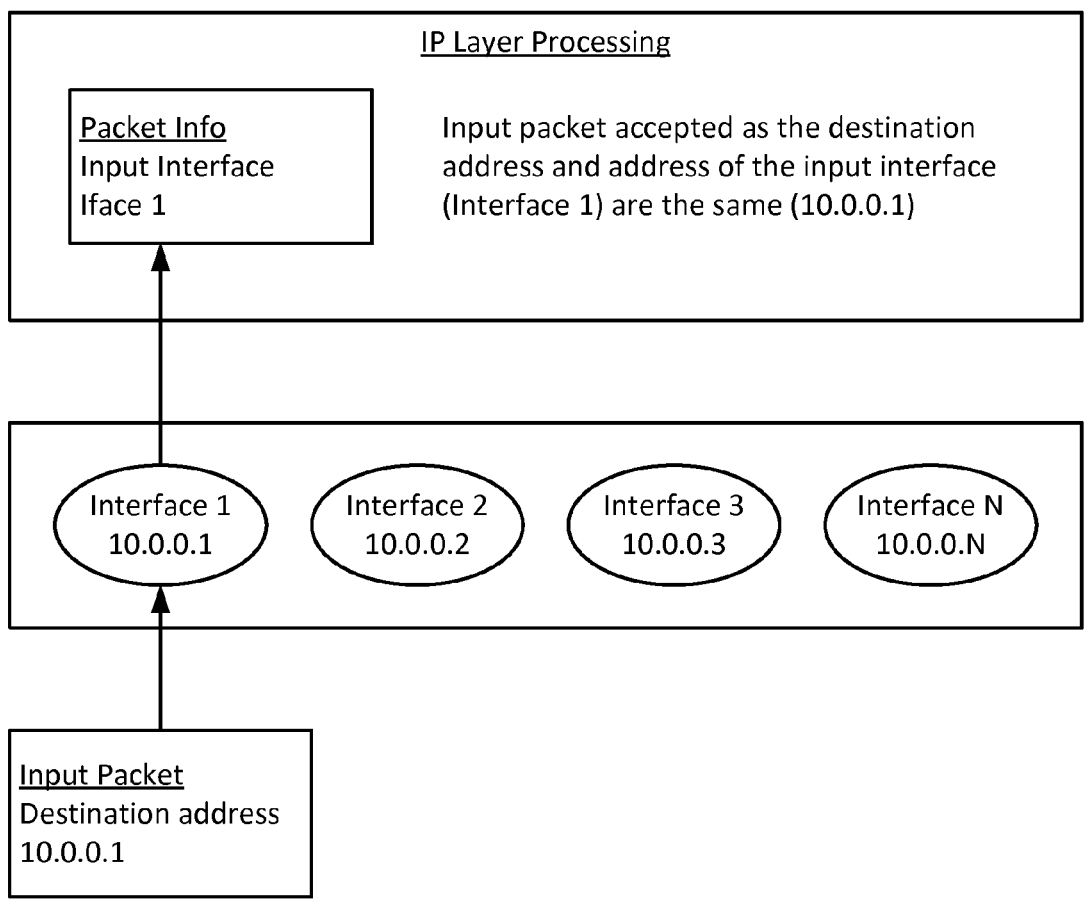
FIG. 7 is a general diagram illustrating a first example of processing an incoming data packet.

FIG. 7 through FIG. 10 illustrate examples that conform to the methods outlined in FIG. 5 and FIG. 6. FIG. 7 depicts an example in which an input packet is received and includes a destination address (10.0.0.1) that is the same as the address of the data interface (10.0.0.1). As such, the input packet is accepted.

Figure 8:
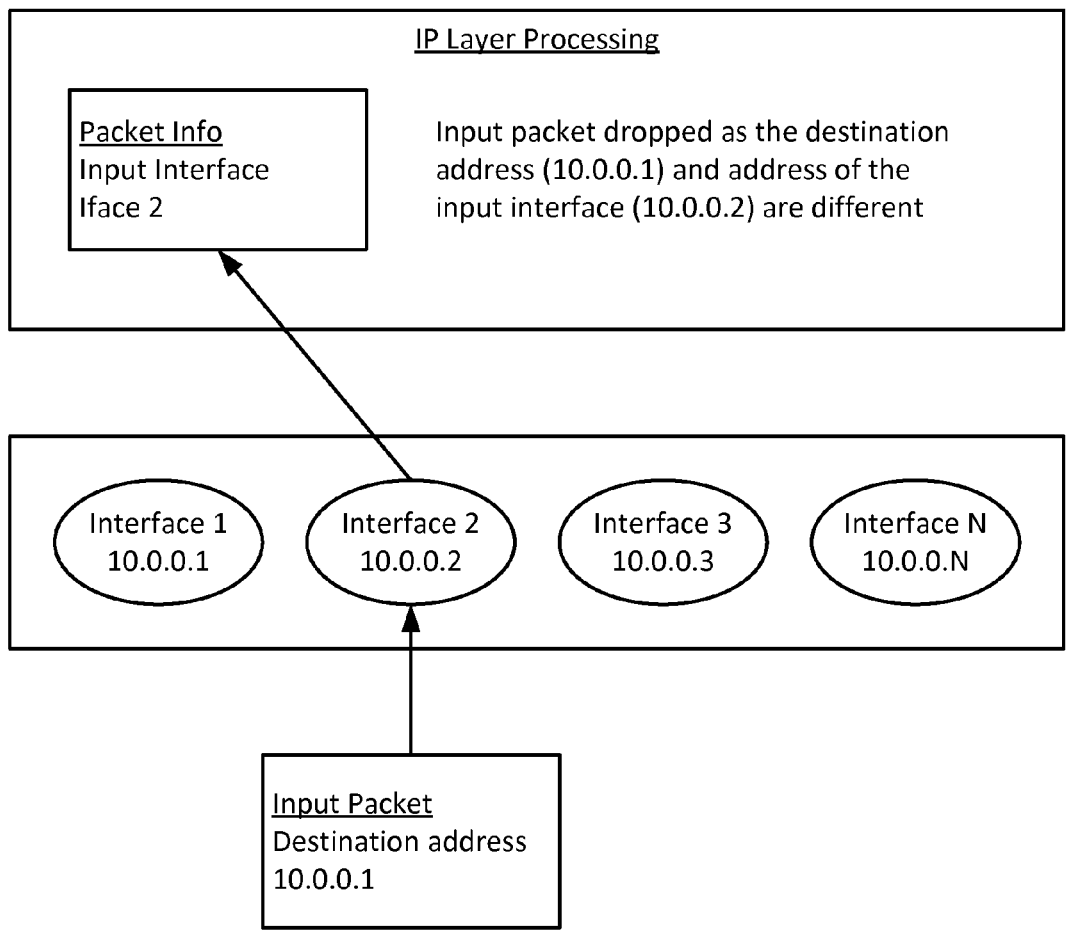
FIG. 8 is a general diagram illustrating a second example of processing an incoming data packet.

FIG. 8 illustrates an example in which an input packet is received and includes a destination address (10.0.0.1) that is different from the address of the input data interface (10.0.0.2) at which the input packet is received. As such, the input packet is dropped.

Figure 9:
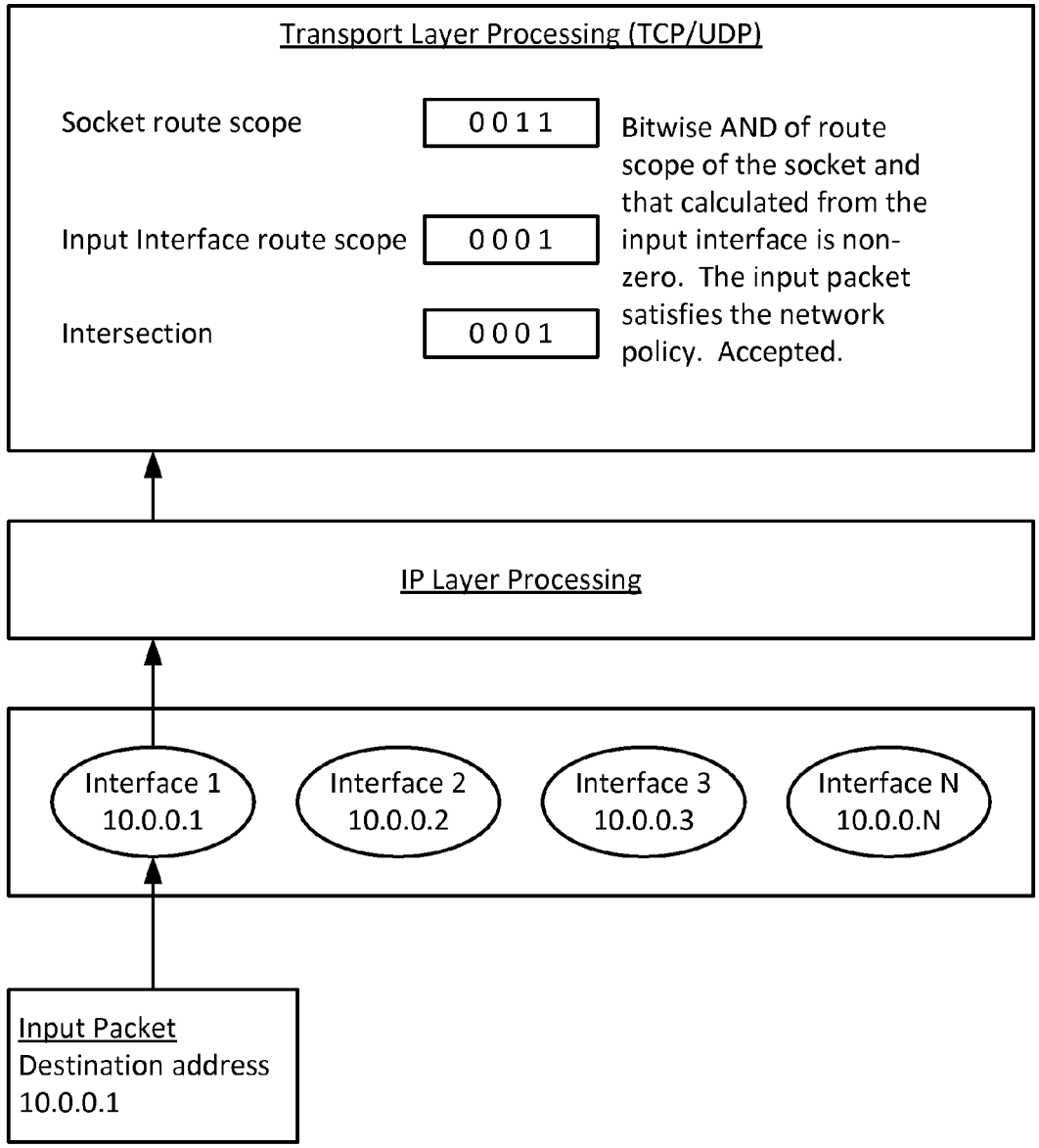
FIG. 9 is a general diagram illustrating a third example of processing an incoming data packet.

FIG. 9 illustrates an example in which an input packet is received on a data interface that satisfies the network policy of an application and is accepted. As shown, the bitwise AND operation that is performed on the route scope of the application and the temporary route scope is non-zero. As such, the input packet satisfies the network policy of the application.

Figure 10:
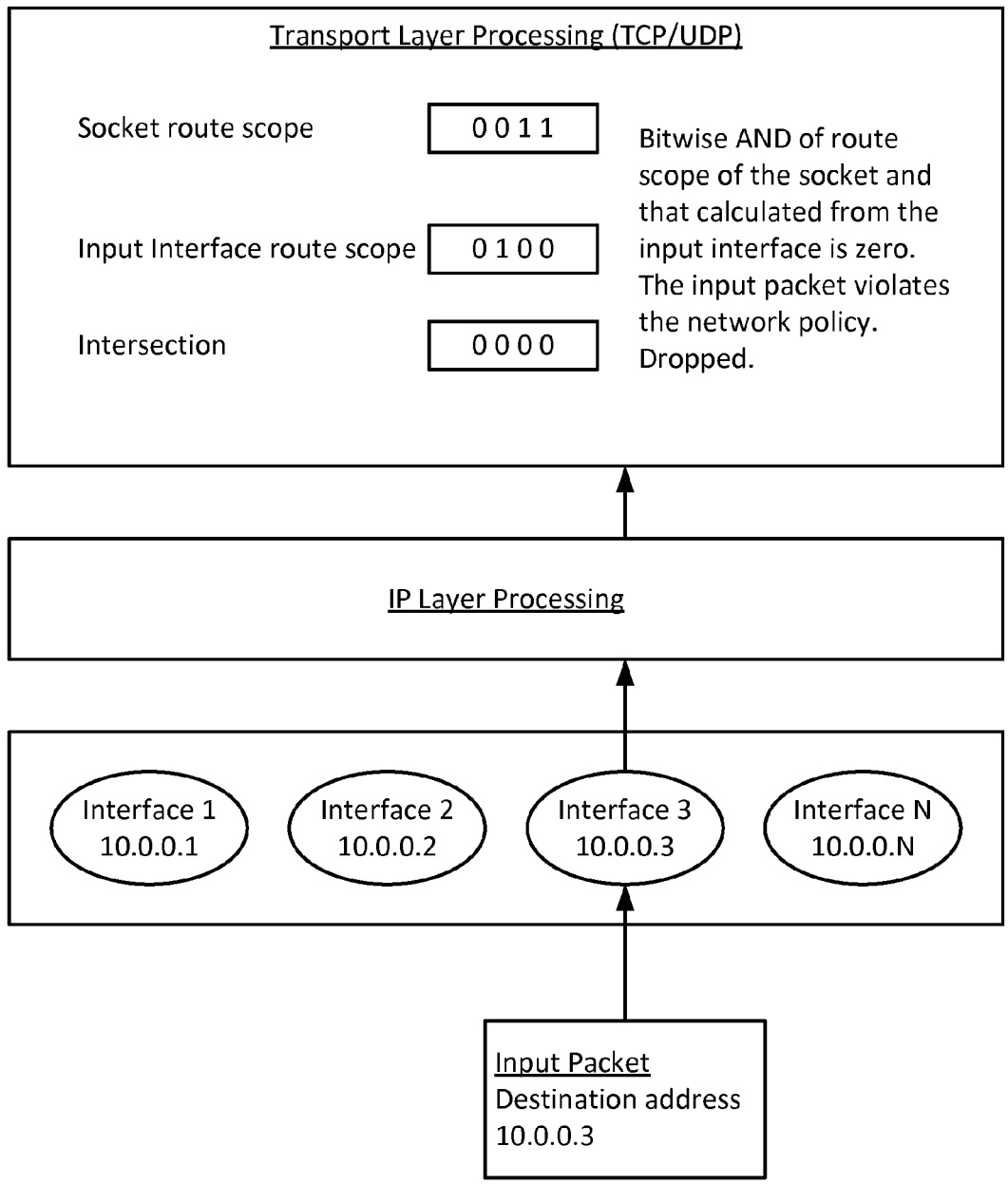
FIG. 10 is a general diagram illustrating a fourth example of processing an incoming data packet.

FIG. 10 illustrates an example in which an input packet is received on a data interface that does not satisfy the network policy of an application. As shown, the bitwise AND operation that is performed on the route scope of the application and the temporary route scope is zero. As such, the input packet violates the network policy of the application and the input packet is dropped.

In a particular embodiment, the dynamic nature of the state of the data interfaces, and wireless networking, may affect the route scope that is associated with each application within a network device. For example, due to the mobility of the network device, the network device may move across the coverage areas of several networks causing corresponding network data interfaces to come up or go down. Also due to mobility, the priority of one network, and an associated network data interface, may increase or decrease depending upon a type of network access that is available or a type of carrier that is providing service at a particular location at a particular time.

Due to the dynamic nature of wireless communication, there can be several triggers that may cause the route scopes associated with the applications within the network device to change. Further, the route scopes associated with the applications need to be managed and changed with the changing states of the data interfaces.

In a particular embodiment, whenever a data interface goes up or down, it can affect the route scope of various applications because the network policy associated with some applications and data interfaces are dynamically configured. For example, when a UMTS data interface is brought up, the UMTS connects to a different access point name (APN) each time, and provides a different type of service. When such a data interface is brought up and is tied to a specific APN, that data interface may no longer match the network policy of one or more applications within the network device. As such, bringing up a particular data interface may shrink down the route scope for one or more applications.

Similarly, when a particular data interface is brought down, it could expand the route scope associated with one or more applications. In a particular embodiment, if a data interface is down, it still can be included in a route scope for an application and the application may potentially use that data interface after it is brought up. Further, in a particular embodiment, some data interfaces, but not all data interfaces may be brought up automatically to save costs. The additional data interfaces may be brought up when required, e.g., by a user or an application.

In a particular embodiment, when a network node changes the network coverage area, the route scope of one or more applications may change. For example, losing the coverage area of one network can cause an associated data interface to become disabled until the data interface is enabled when the network device re-enters a coverage area. In a particular embodiment, a disabled data interface cannot be brought up due to lack of network connectivity while a down data interface can potentially be brought up and used for communication when needed.

In another particular embodiment, certain applications may be tightly bound to a single network data interface and that data interface is used for transmitting and receiving data. For such applications, the route scope has only one bit set and that bit can be set when the data interface is brought up and reset to zero when the data interface is brought down.

In a particular embodiment, the route scope can also change when the network policy associated with the socket is changed. In such an embodiment, a new route scope can be calculated for that application according to the new network policy and the new route scope can be propagated to the socket associated with the application. In another embodiment, if an application binds to a specific IP address, e.g., using a bind( ) API call, the route scope can be restricted to data interfaces which have the particular address to which the socket is bound. Due to mobility and network handoff, the data interface IP address can change and the route scope for the application may need to be updated to exclude the previous data interface from the associated route scope.

Further, in a particular embodiment, if a single network data interface is capable of servicing various technological areas, e.g., CDMA, UMTS, etc., or network types, e.g., IPv4, IPv6 etc., and if such a data interface hands off to a different technological area or network type, the route scopes which include this data interface need to be updated and re-evaluated in order to determine whether the data interface continues to satisfy the network policy of the application. In yet another particular embodiment, for connected sockets, e.g., TCP sockets, once a connection has been established, e.g., using a connect( ) API call, the route scope can be restricted to only one interface that can connect to the specified destination address.

In another particular embodiment, a network policy specified by the application may or may not include a loopback data interface. However, every socket may be allowed to send and receive packets on a loopback data interface. As such, a loopback data interface can be considered a special case of the data interfaces restricted through one or more network policies. A loopback data interface can include a restriction that packets received with a loopback destination IP address should be received on the loopback data interface. This check can be performed at the IP layer as first stage of data interface restriction for input packets, e.g., during an address comparison. For the transport layer restriction, either the bit corresponding to the loopback data interface may be turned on for the route scope associated with each application or a special check can be performed at the transport layer for processing for route scope.

Figure 11:
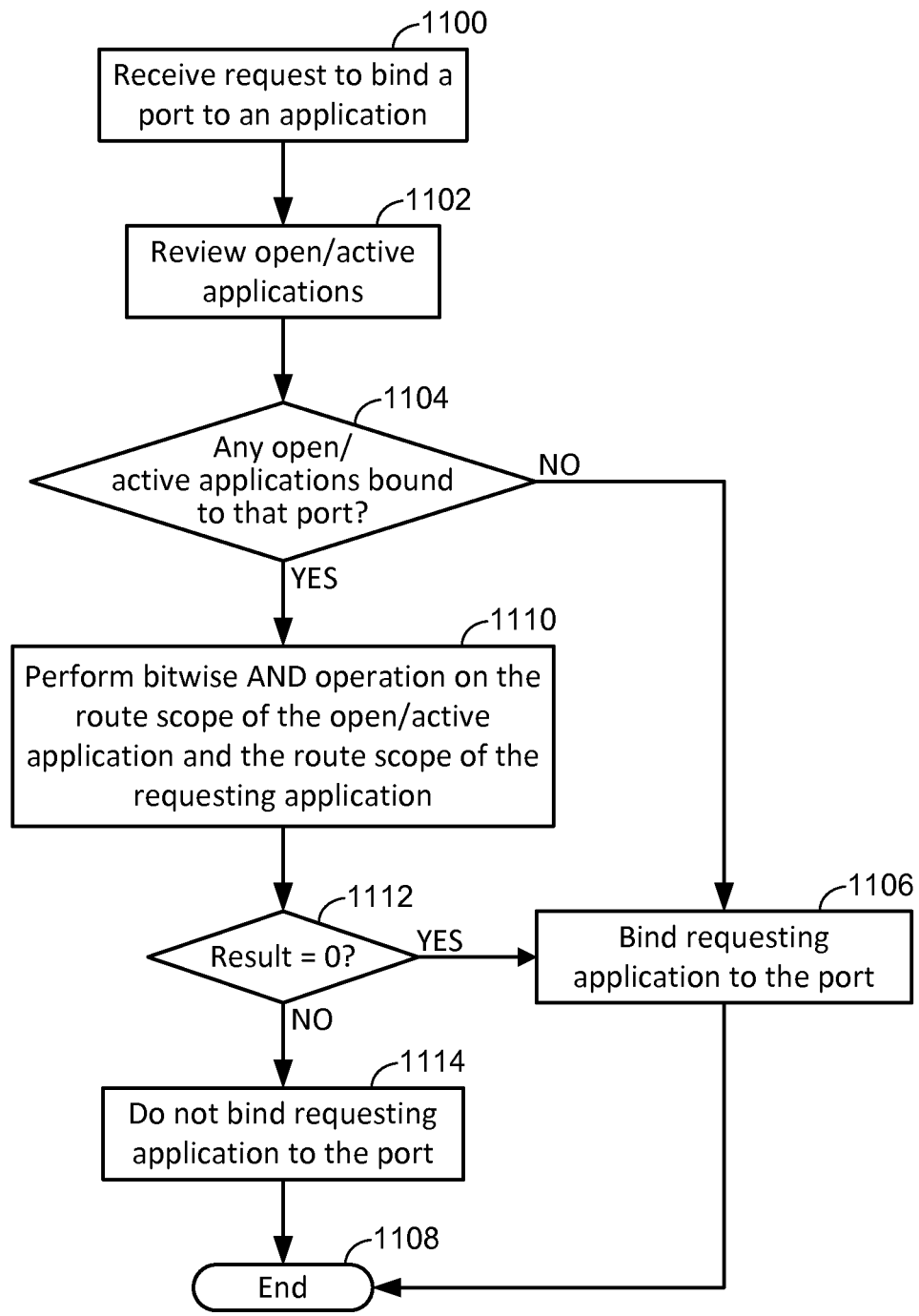
FIG. 11 is a flow chart illustrating a method of binding an application to one or more interfaces at a wireless device.

Referring to FIG. 11, a method of binding an application to a port is shown and commences at block 1100. At block 1100, a routing module within a network device receives a request to bind a port to an application. At block 1102, the routing module reviews all open, or active, applications. Moving to decision step 1104, the routing module determines whether any open, or active, application is bound to the same port to which the requesting application is attempting to bind. If not, the method proceeds to block 1106 and the routing module binds the requesting application to the port. The method then ends at state 1108.

On the other hand, at decision step 1104, if any open, or active, applications are bound to the same port to which the requesting application is attempting to bind, the method proceeds to block 1110 and the routing module performs a bitwise AND operation on the route scope of each open/active application and the route scope of the requesting application. Proceeding to decision step 1112, the routing module determines whether the result of any bitwise AND operation is zero. If so, the method moves to block 1106 and the routing module binds the requesting application to the port setting the port in the socket associated with the requesting application. The method ends at state 1108.

Returning to decision step 1112, if the result of any bitwise AND operation is not zero, the method moves to block 1114 and the routing module does not bind the requesting application to the port. The method then ends at state 1108.

In a particular embodiment, when the route scope of a socket changes due to one or more of the various reasons described above, the new route scope may have an effect on the port space separation. For example, during the recalculation of a route scope for an application, if one or more data interfaces get removed from the route scope, a problem does not arise since the port space remains separate and since no new intersection between the route scopes of the sockets is created. However, if one or more data interfaces are added to the route scope, the addition of a data interface may create a conflict with the route scopes associated with other application. If the port numbers that are used by the applications with intersecting route scopes are same, the networking stack will be unable to decide which application to direct an incoming data packet that arrives on one of the intersecting data interfaces.

In a particular embodiment, this potential conflict can resolved based on the following approach: If the conflicting application is already actively transferring data over the conflicting <port number, data interface> pair, that application is left alone and the other application is prevented from using that <port number, data interface> pair. If the conflicting application is not actively using the <port number, data interface> pair for data transfer, the <port number, data interface> pair is disallowed for the conflicting applications based on a configurable policy.

In a particular embodiment, disallowing an application essentially means that the route scope of the disallowed application temporarily shrinks to exclude the conflicting data interface for the port number in question. This can be handled by defining a set of blocked <port number, data interface> pairs for each application, i.e., a blocked route scope. In a particular embodiment, a blocked route scope is the one that is temporarily blocked due to a conflict with another application but not due to network policy mismatch.

In a non-limiting, exemplary embodiment, an entry in a blocked route scope can be removed: (1) when the competing application closes, (2) when the competing application rebinds to another port space, (3) when the disallowed application rebinds to a different port space, (4) when the network policy of the disallowed application changes, (5) when the network policy of the competing application changes, or (6) when the route scope of the one or more applications changes due to the conditions defined above.

In a particular embodiment, conditions (2) and (5) above can cause the route scopes for other applications within the network device to be blocked. Further, in a particular embodiment, the conditions (3) and (4) may cause some entries to be removed from a blocked route scope while other entries may be added due to new conflicts.

In a particular embodiment, the steps described above in conjunction with FIG. 3, FIG. 4, FIG. 5, FIG. 6, and FIG. 11 can be embodied as software that is stored within a memory, e.g., random access memory (RAM), a dynamic random access memory (DRAM), a static random access memory (SRAM), a read only memory (ROM), a masked ROM, a programmable read only memory (PROM), an erasable and programmable read only memory (EPROM), an electronically erasable and programmable read only memory (EEPROM), a non-volatile random access memory (NVRAM), a flash memory, a hard disk drive, or other storage means. Each of these method steps can be stored individually or in combination with other method steps.

Further, in a particular embodiment, the method steps described above in conjunction with FIG. 3, FIG. 4, FIG. 5, FIG. 6, and FIG. 11 can be executed by a processor, a microprocessor, a controller, a microcontroller, an application specific integrated circuit (ASIC), a digital signal processor (DSP), or other processing means. Each of these method steps can be executed individually or in combination with other method steps.

Figure 12:
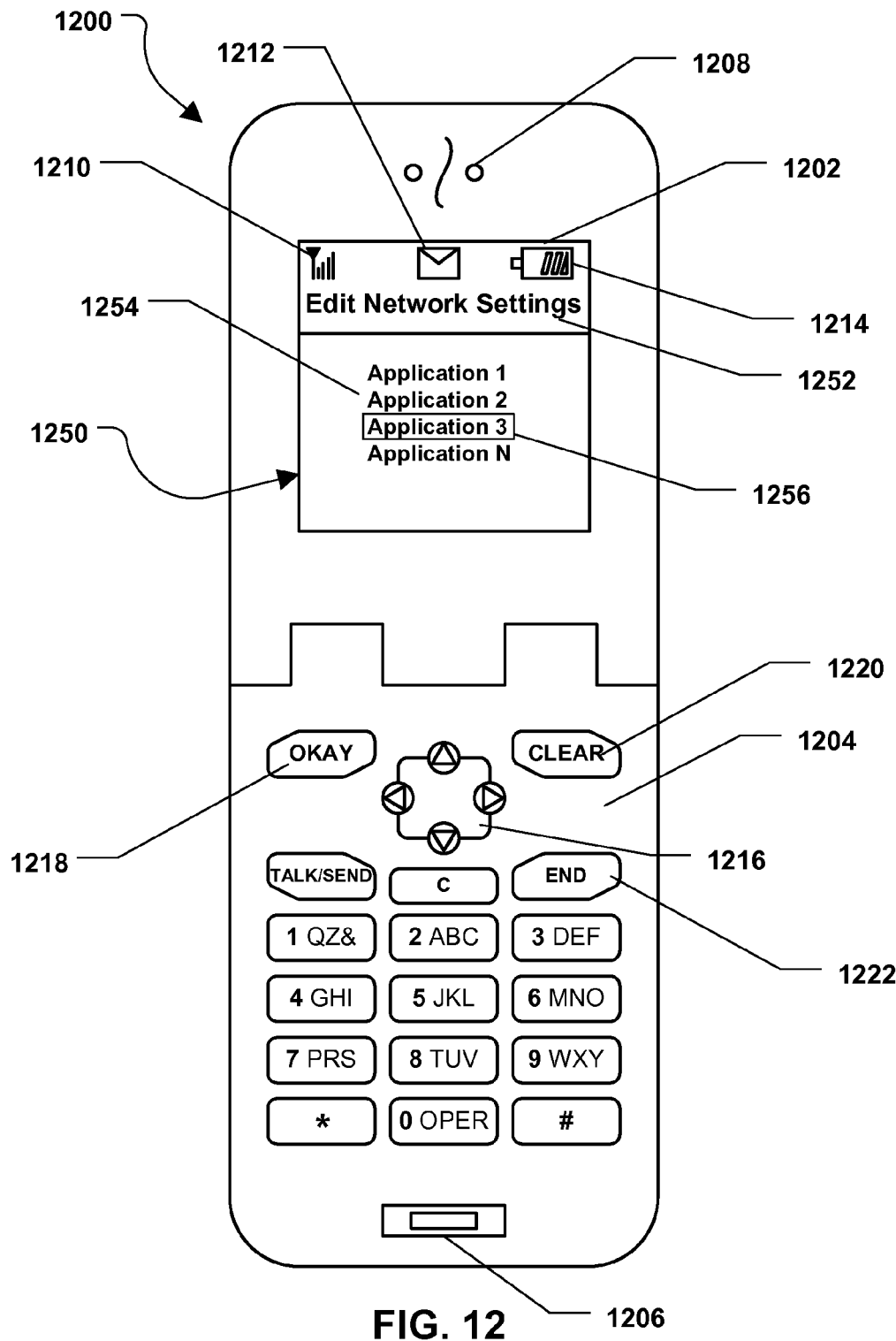
FIG. 12 is a diagram of a wireless device having a first graphical user data interface.

FIG. 12 illustrates a wireless device that is generally designated 1200. As shown, the wireless device 1200 includes a display 1202 and a keypad 1204. Further, the wireless device 1200 can include a microphone 1206 and a speaker 1208. A user can speak into the microphone 1206 and listen to incoming audio via the speaker 1208. As indicated in FIG. 12, a signal strength indicator 1210, a voicemail indicator 1212, and a battery level indicator 1214 can be displayed by the display 1202.

As depicted in FIG. 12, in an exemplary, non-limiting embodiment, the keypad 1204 can include a directional button 1216 that a user can use to move a cursor or selector bar around at the display 1202. Specifically, the user can use to the directional button 1216 to move a cursor or selector bar in any direction, e.g., up, down, left, right, or any diagonal direction. Further, in a particular embodiment, the keypad 1204 can include an okay button 1218, a clear button 1220, and an end button 1222. A user can use the okay button 1218, the clear button 1220, and the end button 1222 to input answers in response to prompts presented at the display 1202.

FIG. 12 further illustrates a first exemplary graphical user data interface (GUI) 1250 that can be presented to a user via the display 1202 of the wireless device 1200. As shown, the first GUI 1210 can include a header 1252 that indicates the purpose of the first GUI 1250. As shown, in an illustrative embodiment, the header 1252 is labeled "Edit Network Settings." As such, a user can surmise that the first GUI 1250 can be used to edit network settings.

FIG. 12 also indicates that the first GUI 1250 can include an application menu 1254. In a particular embodiment, the application menu 1254 includes a list of applications that are installed at the wireless device 1200 that require network access. For example, the application menu 1254 includes a first application, a second application, a third application, and an Nth application. As shown, the first GUI 1250 also includes a selector bar 1256 that a user can move up and down within the application menu 1254 using the directional button 1216 at the keypad 1204. A user can move the selector bar 1256 to an application, e.g., the third application, and select the okay button 1218 at the keypad 1204 in order to access a second GUI 1300 shown in FIG. 13.

Figure 13:
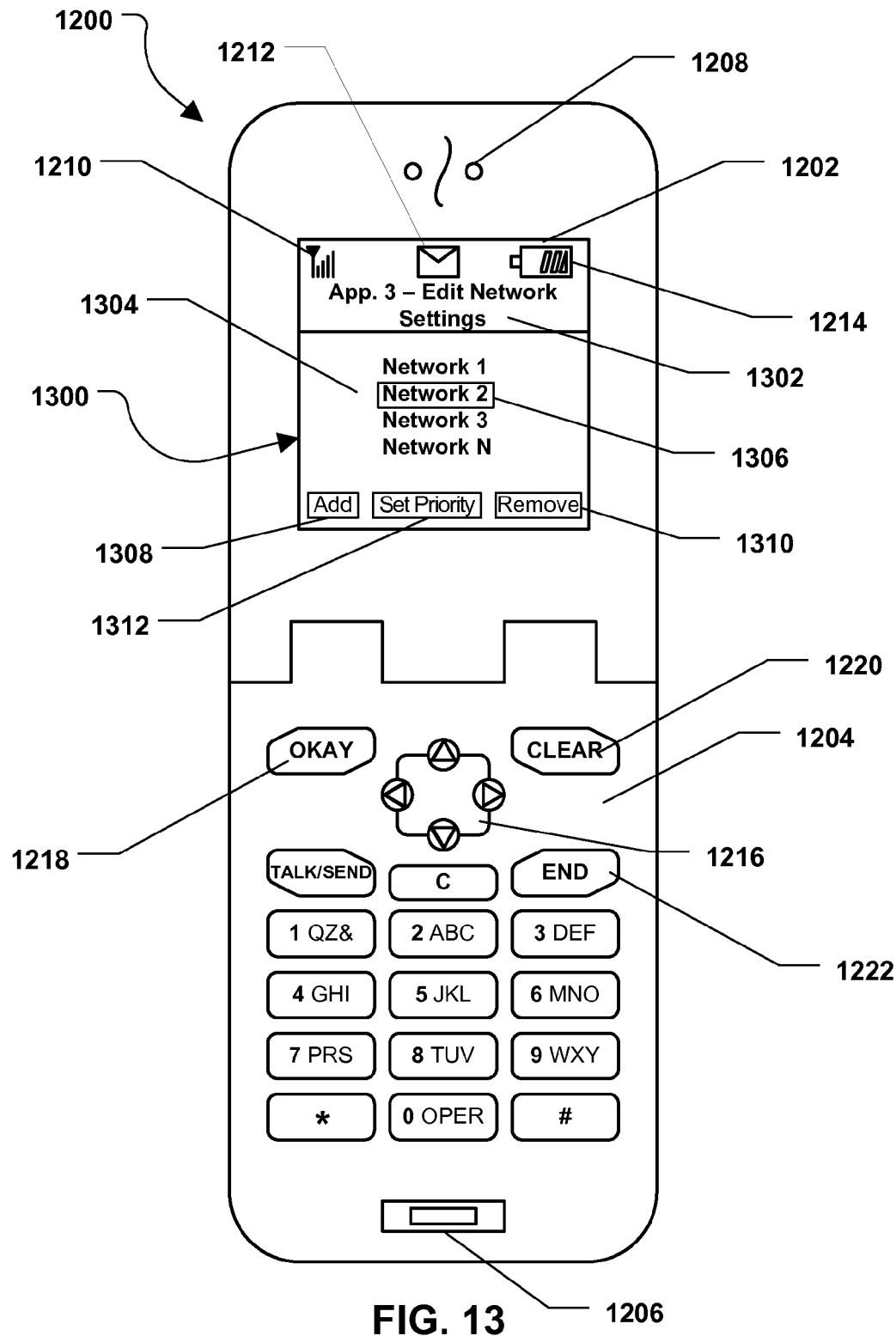
FIG. 13 is a diagram of a wireless device having a second graphical user data interface.

FIG. 13 illustrates a second exemplary GUI, designated 1300, that can be used to edit the settings for an application, e.g., the third application selected at using the first GUI 1250 (FIG. 12). As depicted in FIG. 13, the second GUI 1300 can include a header 1302 that indicates the purpose of the second GUI 1300. In an illustrative embodiment, the header 1302 of the second GUI 1300 is labeled "App. 3—Edit Network Settings". As such, a user can determine that the second GUI 1300 can be used to edit network settings for the third application.

In an alternative embodiment, if the user selects the first application at the first GUI 1250 (FIG. 12), the header 1302 of the second GUI 1300 can be labeled "App. 1—Edit Network Settings".

As shown in FIG. 13, the second GUI 1300 can include a network menu 1304 that includes a list of networks, or network data interfaces, that are available at the wireless device 1200. For example, the network menu 1304 includes a first network, a second network, a third network, and an Nth network. The second GUI 1300 also includes a selector bar 1306 that a user can move up and down within the network menu 1304 using the directional button 1216 at the keypad 1204. A user can move the selector bar 1306 to a network, e.g., the second application, and select an add soft button 1308 or a remove soft button 1310 in order to add or remove a network to a list of approved networks for a particular application that is installed at the wireless device 1200.

As shown, the second GUI 1300 also includes a set priority soft button 1312 that is displayed at the display 1202. In a particular embodiment, a user can select the set priority soft button 1312 in order to establish a hierarchy of networks approved for use by a particular application within the wireless device 1200. When the set priority soft button 1312 is selected, a third GUI 1400 can be presented to the user via the display 1202. Alternatively, predefined ACLs can be used to describe a network policy and assign priority to the data networks.

Figure 14:
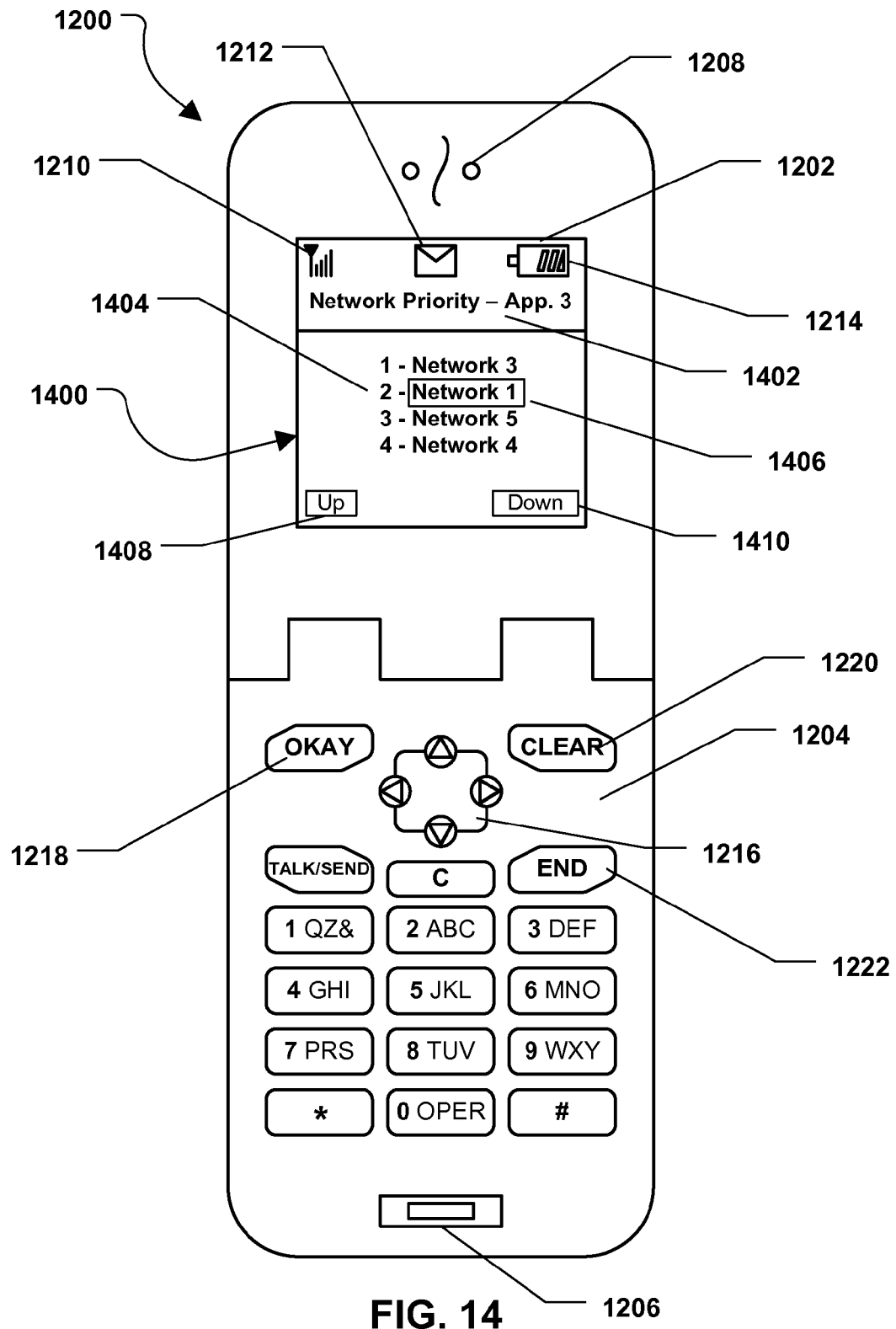
FIG. 14 is a diagram of a wireless device having a third graphical user data interface.

Referring to FIG. 14, the third GUI 1400 is shown. As depicted in FIG. 14, the third GUI 1400 can include a header 1402 that indicates the purpose of the third GUI 1400. For example, the header 1402 of the third GUI 1400 is labeled "Network Priority—App. 3". As such, a user can determine that the third GUI 1400 can be used to edit the network priority for the networks approved for use by the third application.

In an alternative embodiment, if the user selects the first application at the first GUI 1250 (FIG. 12) and the user selects the set priority soft button 1312 at the second GUI 1300 (FIG. 13), the header 1402 of the third GUI 1400 may be labeled "Network Priority—App. 1".

As shown in FIG. 14, the third GUI 1400 can include a network priority menu 1404 that includes a list of networks, or network data interfaces, that are approved for use by the third application. Also, the network priority menu 1404 indicates the priority of each approved network, or network data interface. For example, the network priority menu 1404 includes a third network with a first priority, a first network with a second priority, a fifth network with a third priority, and an fourth network with a fourth priority.

The third GUI 1400 also includes a selector bar 1406 that a user can move up and down within the network priority menu 1404 using the directional button 1216 at the keypad 1204. A user can move the selector bar 1406 to a network, e.g., the first application, and select an up soft button 1408 or a down soft button 1410 in order to move the first network up or down within the network priority menu 1404. As such, a user can define the priority of networks that an application can utilize during data transfer.

Figure 15:
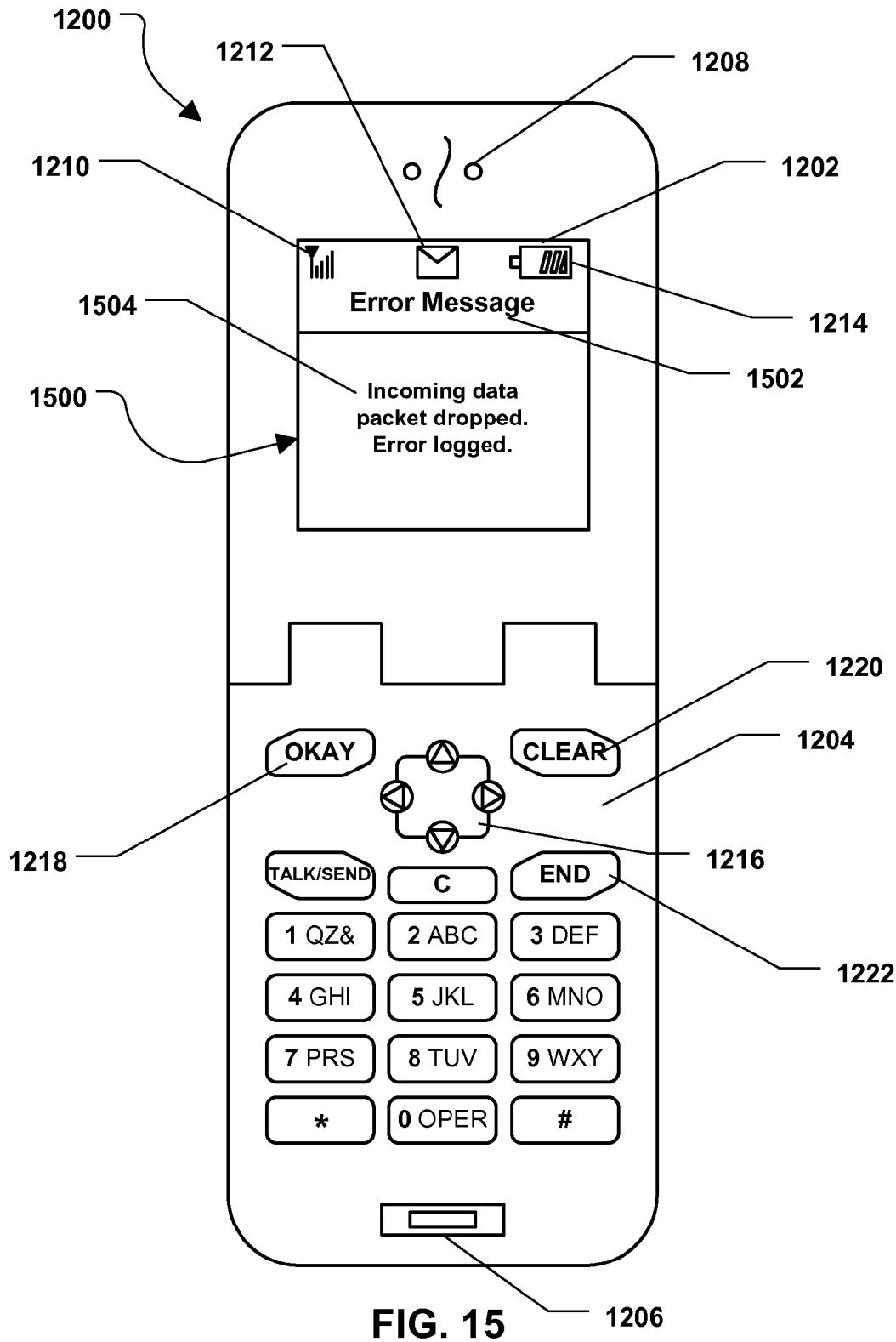
FIG. 15 is a diagram of a wireless device having a fourth graphical user data interface.

FIG. 15 illustrates a fourth GUI 1500 that can be presented to a user when an attempt to send a data packet to an application is prevented. As depicted in FIG. 15, the fourth GUI 1500 can include a header 1502 that indicates the purpose of the fourth GUI 1500. For example, the header 1502 of the fourth GUI 1500 is labeled "Error Message". As such, a user can surmise that the wireless device has encountered an error. FIG. 15 further indicates that the fourth GUI 1500 can include an error message 1504 that can be presented to the user via the display 1202. In an exemplary, non-limiting embodiment, the error message indicates "Incoming data packet dropped. Error logged." As such, the user knows that an outside device attempted to transmit a data packet to the wireless device, e.g., an application within the wireless device, and that the data packet was dropped for being suspicious. In a particular embodiment, errors can be logged at the wireless device. Alternatively, errors can be logged at a network device at the network from which the suspicious packet is received.

In a particular embodiment, each GUI 1250, 1300, 1400, 1500 described above is a stand-alone GUI. Alternatively, the GUIs 1250, 1300, 1400, 1500 described above are part of a single GUI having multiple pages.

With the configuration of structure described herein, the system and method to support data applications in a multi-homing, multi-mode communication device provides a way for applications within a network device to specify which data interface to use for data networking. For example, a particular network data interface within a network device may provide access to a general network, e.g., the Internet, while another network data interface may provide access to a private corporate Intranet. Also, the network device can include a first email client application to access email from the private corporate network and a second email client application to retrieve personal email over the Internet.

In a particular embodiment, the network device can include a "special" browser for access to a private Intranet and an "of the shelf" browser for general Internet access. Also, the network device can include multiple GPS engines and each GPS engine can access location information from a particular network via a data interface specified by the GPS engine. Additionally, in a particular embodiment, a name resolver, e.g., a domain name system (DNS), that communicates with the network device can resolve a name, or address, for a specific network since there could be duplicate names, or addresses, configured in two private networks.

Further, with the configuration of structure described herein, the system and method can restrict the number of data interfaces on which an application can receive the data. This provides a relatively higher level of security to the protocol stack and the applications within the network device. Also, the system and method provides a way to restrict incoming data so that the incoming data is communicated to a particular application based on the data interface, or data interfaces, on which the data is received. The system can utilize a network policy associated with each application in order to identify the data interfaces that are allowed for data transfer for each application.

Moreover, the system and method described herein can allow applications to bind to specific ports for one, more, or all data interfaces. For other protocol stacks, e.g., non-TCP/UDP/IP, applications can be allowed to gain access to services over a set of data interfaces.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of the methods, or algorithms, described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method comprising:
    receiving a request to bind a port to a requesting application, wherein the requesting application is associated with a first route scope that identifies a first set of data interfaces;
    determining whether an open application is bound to the port;
    binding the requesting application to the port when the open application is not bound to the port, wherein a second application is bound to the port at the same time as the requesting application during a time period, wherein the second application is associated with a second route scope that identifies a second set of data interfaces, wherein each data interface included in the first set of data interfaces is not included in the second set of data interfaces, and wherein the second application is distinct from the open application;
    identifying a change in the first route scope, wherein the change is associated with an additional data interface being added to the first set of interfaces;
    determining whether a conflict exists based on the additional data interface being included in the second set of data interfaces; and
    when the additional data interface is determined to be included in the second set of data interfaces, resolving the conflict.

2. The method of claim 1, further comprising performing a bitwise AND operation on a route scope associated with the open application and the first route scope when the open application is bound to the port.

3. The method of claim 2, further comprising binding the requesting application to the port when a result of the bitwise AND operation is zero.

4. The method of claim 3, further comprising preventing the requesting application from binding to the port when the result of the bitwise AND operation is not zero.

5. The method of claim 1, wherein the first set of data interfaces satisfy a network policy.

6. The method of claim 5, wherein the first set of data interfaces is organized in a hierarchy.

7. The method of claim 5, wherein each data interface of the first set of data interfaces includes a different network address.

8. The method of claim 5, wherein binding the requesting application to the port binds the requesting application to each data interface of the first set of data interfaces.

9. The method of claim 8, further comprising iteratively attempting to establish communication via each data interface of the first set of data interfaces bound to the requesting application based on a hierarchy order of the first set of data interfaces, and discontinuing further attempts to establish communication after communication is established via a particular data interface of the first set of data interfaces.

10. The method of claim 8, wherein each data interface bound to the requesting application is selectable for a data transmission, a data reception, or a combination thereof.

11. The method of claim 8, further comprising:
    determining whether the requesting application is attempting to transmit data when the requesting application is bound to the first set of data interfaces; and
    determining whether a preferred data interface is one of the first set of data interfaces bound to the requesting application.

12. The method of claim 1, further comprising receiving data at a first data interface when the port is bound to the requesting application.

13. The method of claim 12, further comprising creating a temporary route scope associated with the received data.

14. The method of claim 13, further comprising determining whether the first data interface is one of the first set of data interfaces based on a comparison of the temporary route scope to the first route scope.

15. An apparatus comprising:
    means for receiving a request to bind a port to a requesting application, wherein the requesting application is associated with a first route scope that identifies a first set of data interfaces;
    means for determining whether an open application is bound to the port;
    means for binding the requesting application to the port when the open application is not bound to the port, wherein a second application is bound to the port at the same time as the requesting application during a time period, wherein the second application is associated with a second route scope that identifies a second set of data interfaces, wherein each data interface included in the first set of data interfaces is not included in the second set of data interfaces, and wherein the second application is distinct from the open application;

means for identifying a change in the first route scope, wherein the change is associated with an additional data interface being added to the first set of interfaces;

means for determining whether a conflict exists based on the additional data interface being included in the second set of data interfaces; and means for resolving the conflict when the additional data interface is determined to be included in the second set of data interfaces.

16. The apparatus of claim 15, further comprising:

means for receiving data at a data interface when the port is bound to the requesting application;

means for creating a temporary route scope associated with the received data; and means for determining whether the data interface matches at least one data interface of the first set of data interfaces based on a comparison of the temporary route scope to the first route scope.

17. A non-transitory computer-readable medium comprising instructions that, when executed by a processor, cause the processor to:

receive a request to bind a port to a requesting application, wherein the requesting application is associated with a first route scope that identifies a first set of data interfaces;

determine whether an open application is bound to the port;

bind the requesting application to the port when the open application is not bound to the port, wherein a second application is bound to the port at the same time as the requesting application during a time period, wherein the second application is associated with a second route scope that identifies a second set of data interfaces, wherein each data interface included in the first set of data interfaces is not included in the second set of data interfaces, and wherein the second application is distinct from the open application identify a change in the first route scope, wherein the change is associated with an additional data interface being added to the first set of interfaces;

determine whether a conflict exists based on the additional data interface being included in the second set of data interfaces; and when the additional data interface is determined to be included in the second set of data interfaces, resolve the conflict.

18. An apparatus comprising:

a processor configured to:

receive a request to bind a port to a requesting application, wherein the requesting application is associated with a first route scope that identifies a first set of set interfaces;

determine whether an open application is bound to the port;

bind the requesting application to the port when the open application is not bound to the port, wherein a second application is bound to the port at the same time as the requesting application during a time period, wherein the second application is associated with a second route scope that identifies a second set of data interfaces, wherein each data interface included in the first set of data interfaces is not included in the second set of data interfaces, and wherein the second application is distinct from the open application;

identify a change in the first route scope, wherein the change is associated with an additional data interface being added to the first set of interfaces;

determine whether a conflict exists based on the additional data interface being included in the second set of data interfaces; and when the additional data interface is determined to be included in the second set of data interfaces, resolve the conflict; and a memory operably connected to said processor.

19. The apparatus of claim 18, wherein the processor is further configured to:

receive data at a data interface when the port is bound to the requesting application;

create a temporary route scope associated with the received data; and determine whether the data interface matches at least one data interface of the first set of data interfaces based on a comparison of the temporary route scope to the first route scope.

20. The apparatus of claim 18, wherein the first set of data interfaces satisfy a network policy.

* * * * *